United States Patent
Ames

(10) Patent No.: US 7,295,493 B1
(45) Date of Patent: Nov. 13, 2007

(54) PRESSURE TOLERANT FIBER OPTIC HYDROPHONE

(75) Inventor: Gregory H. Ames, South Kingstown, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/602,431

(22) Filed: Oct. 19, 2006

(51) Int. Cl.
*G01H 9/00* (2006.01)

(52) U.S. Cl. ............................ 367/149; 367/172

(58) Field of Classification Search ............... 367/149, 367/172, 173, 188; 385/12, 13
See application file for complete search history.

(56) References Cited

U.S. PATENT DOCUMENTS

| | | | | |
|---|---|---|---|---|
| 4,525,818 A * | 6/1985 | Cielo et al. | ............... | 367/149 |
| 4,570,248 A * | 2/1986 | Assard | ............... | 367/149 |
| 4,825,424 A * | 4/1989 | Lamb et al. | ............... | 367/141 |
| 4,893,930 A * | 1/1990 | Garrett et al. | ............... | 356/477 |
| 5,155,548 A * | 10/1992 | Danver et al. | ............... | 356/478 |
| 5,253,222 A * | 10/1993 | Danver et al. | ............... | 367/149 |
| 5,285,424 A * | 2/1994 | Meyer | ............... | 367/149 |
| 5,317,544 A * | 5/1994 | Maas et al. | ............... | 367/149 |
| 5,317,929 A * | 6/1994 | Brown et al. | ............ | 73/514.01 |
| 5,361,240 A * | 11/1994 | Pearce | ............... | 367/157 |
| 5,363,342 A * | 11/1994 | Layton et al. | ............... | 367/149 |
| 5,394,377 A * | 2/1995 | vonBieren | ............... | 367/149 |
| 5,504,720 A * | 4/1996 | Meyer et al. | ............... | 367/149 |
| 5,589,937 A * | 12/1996 | Brininstool | ............... | 356/480 |
| 5,625,724 A * | 4/1997 | Frederick et al. | ............... | 367/149 |
| 5,668,779 A * | 9/1997 | Dandridge et al. | ............... | 367/149 |
| 5,737,478 A * | 4/1998 | Yamagishi et al. | ............... | 367/149 |
| 6,108,274 A * | 8/2000 | Pearce | ............... | 367/157 |
| 6,122,225 A * | 9/2000 | Cheng et al. | ............... | 367/149 |
| 6,549,488 B2 * | 4/2003 | Maas et al. | ............... | 367/149 |
| 6,882,595 B2 * | 4/2005 | Woo | ............... | 367/149 |
| 7,082,079 B2 * | 7/2006 | Woo | ............... | 367/149 |
| 2003/0035344 A1 * | 2/2003 | Maas et al. | ............... | 367/149 |
| 2004/0184352 A1 * | 9/2004 | Woo | ............... | 367/149 |
| 2004/0202401 A1 * | 10/2004 | Berg et al. | ............... | 385/12 |
| 2005/0195687 A1 * | 9/2005 | Woo | ............... | 367/149 |
| 2006/0198246 A1 * | 9/2006 | Frederick et al. | ............... | 367/149 |

* cited by examiner

*Primary Examiner*—Daniel Pihulic
(74) *Attorney, Agent, or Firm*—James M. Kasischke; Michael P. Stanley; Jean-Paul A. Nasser

(57) ABSTRACT

An interferometric hydrophone is disclosed that comprises a first mandrel defining an interior that is open to surrounding fluid. A sensing optical fiber is wound upon the first mandrel. A second mandrel is positioned in surrounding relationship with respect to the first mandrel. The first and second mandrels define a first chamber therebetween. A case encloses the first and second mandrels and first chamber. The cylindrical case and the second cylindrical mandrel define a second chamber therebetween, which is sealed and filled with gas or vacuum.

16 Claims, 3 Drawing Sheets

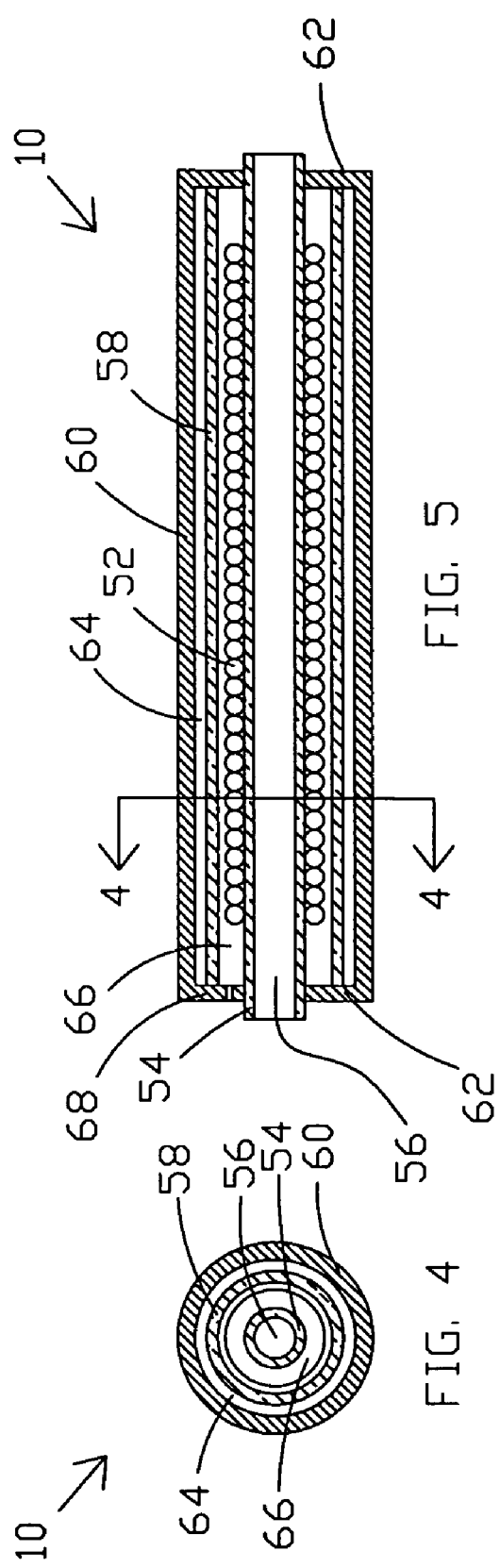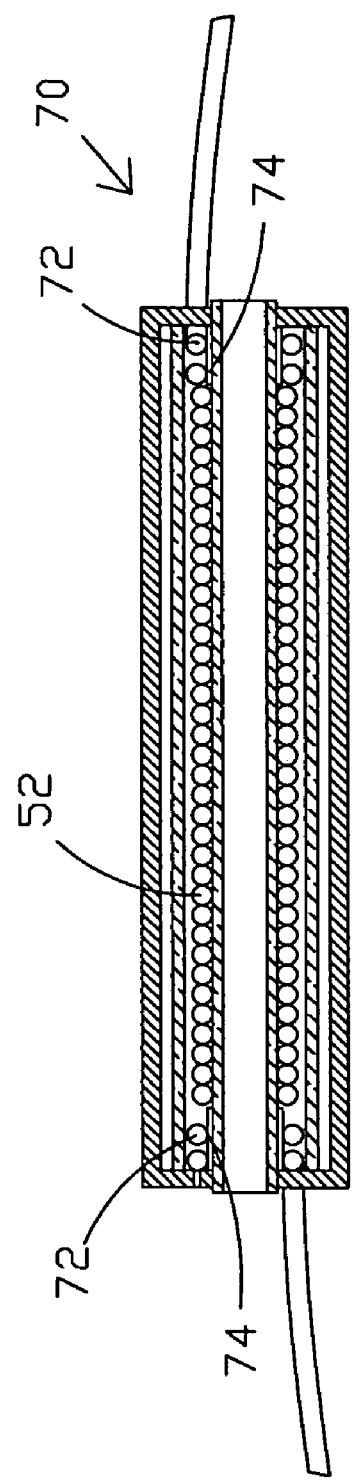

PRESSURE TOLERANT FIBER OPTIC HYDROPHONE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to hydrophones and, more particularly, to an enhanced sensitivity fiber optic interferometric hydrophone in which the path mismatch of the interferometer does not vary with changes in static pressure due to depth of operation.

2. Description of the Prior Art

Fiber optic interferometric hydrophones are well known in the art. They generally take one of two forms. In the planar hydrophone form, the hydrophones consist in part of fiber wound spirally into a disc form. In the linear hydrophone form of interest to this invention, the hydrophone consists in part of fiber wound around a cylindrical pressure-compliant sensor mandrel. Though many different materials may be used for the mandrel, the most sensitive designs use a hollow, sealed, air-filled mandrel. This fiber wrapped sensor mandrel is only part of the hydrophone. The complete hydrophone may take several forms.

One such form is the Michelson interferometer type hydrophone 20 shown in FIG. 1. The interrogating light signal is split by coupler 22 to two fiber optic branches. One branch is comprised of fiber wrapped sensor mandrel 24 previously described. Reflector 26 at the end of the signal fiber reflects light back though the sensor fiber to coupler 22. The other branch, or reference branch 28 is comprised of the same or nearly the same length of fiber wrapped in such a manner as to be insensitive to pressure. This branch is also terminated with a reflector 26 to reflect the light back to coupler 22. Sometimes the two wrappings are located concentric to each other, while in other designs they may merely be located near each other.

A second form is a Mach-Zehnder interferometer type hydrophone 30 shown in FIG. 2. This is similar to the Michelson type interferometer 20, except that the light is not reflected at the ends of the two branches, but recombined into a single path by a second coupler 32.

A third form is the pseudo-Fabry-Perot interferometer type hydrophone 40 shown in FIG. 3. Here, the sensor is comprised of only sensor mandrel 24 previously described, and two partial reflectors 42, one on either side of the mandrel. Partial reflectors 42 may be broadband partial mirrors or narrowband Bragg gratings. The second reference path is actually provided at a remote location in the transmitter/receiver equipment of the interferometer. There, a device known as a compensator splits pulsed light into two paths, delaying one set of pulses in relation to the other.

A primary disadvantage of previous types of hydrophones is that very expensive, low frequency noise lasers must be used to interrogate them. Less expensive lasers such as diode distributed feedback (DFB) lasers have higher levels of frequency noise, which limit the system noise performance. The system laser phase noise is proportional to the laser frequency noise and to the path mismatch length between the two branches of the interferometer. The Michelson type hydrophone generally requires a path mismatch of a few meters between the two paths of the sensor. The pseudo-Fabry-Perot type hydrophone can be precisely path matched to within a few millimeters. However, in all previous designs, static pressure changes occurring as the hydrophone changes water depth result in changes in the sensor path length and the mismatch. Such mismatches can be tens of centimeters, leading to unacceptable increases in laser phase noise.

A second disadvantage of previous designs of hydrophones is that they tend to be sensitive to a broad range of acoustic frequencies. In most applications, a restricted range of frequencies is of interest and the sensitivity to lower frequencies may cause problems, limiting performance in the band of interest.

The following U.S. patents describe various prior art systems that may be related to the above and/or other telemetry systems:

U.S. Pat. No. 4,525,818, issued Jun. 25, 1985, to Cielo et al, discloses an optical fiber hydrophone system in which a single optical fiber is used for all of the acoustical sensors in the system. A signal source and detector provides an optical signal in selected form, such as continuous or pulsed, and detects and extracts an identifiable output signal. Each sensor is in the form of a sensing portion of the single optical fiber. Each sensing portion includes two optical reflectors separated one from another by a predetermined length of said optical fiber. Variations in acoustical pressure incident on the sensing portion cause a change in the predetermined length. This causes reflected portions of the optical signal to interfere with one another. Such interference is detectable for extraction of the identifiable output signal. In one form, each sensing portion has two terminal branches of a mechanically deformable material, deformable in response to the fluctuations in acoustical pressure. Preferably, the optical fiber has two portions, a sensing portion thereof underwater and having a first optical cavity, and another portion thereof on board a vessel and having a second optical cavity, typically tunable with respect to the optical length thereof to maximize the interference in the detected optical signal.

U.S. Pat. No. 5,253,222, issued Oct. 12, 1993, to Danver et al, discloses an omnidirectional fiber optic hydrophone that includes a concentrically-arranged pair of ring-shaped mandrels mounted between planar upper and base members. Each of the rings is formed of inner and outer annular portions separated by an annular void. Optical fibers wound about the outer circumference of the outer annular portion of the outer ring and about the outer circumference of the inner annular portion of the inner ring communicate with a source of optical energy and with a photodetector to provide signals for measuring acoustic wave-induced deflections of the rings. A plurality of mandrels may be employed in a single hydrophone, which may be potted with elastomeric material or free flooded.

U.S. Pat. No. 5,317,544, issued May 31, 1994, to Maas et al, discloses a hydrophone that includes a plurality of hydrophone components separated by finite spacings and interconnected to provide a single output signal. Each hydrophone component is based upon a single-mandrel design in which a cylindrical body is apportioned into sensing and reference sections. The sensing sections comprise coaxial arrangements of pliant inner and outer cylinders separated by an annular airspace while the adjacent reference sections comprise solid-walled cylinders. Finite separation distances between the hydrophone components result in reduced flow noise occasioned by increased sensing area while detection sensitivity is maintained.

U.S. Pat. No. 5,394,377, issued Feb. 28, 1995, to von-Bieren, discloses a hydrophone that is formed of first and second optical fibers coupled together to form a fiber optic interferometric sensor for sensing an acoustic signal. The optical fibers are wrapped around a pair of concentric, thin-walled hollow cylinders. The fiber wrapped around the inner cylinder is the reference leg of the interferometer and the fiber wrapped around the outer cylinder is the signal leg. The reference leg is exposed to the hydrostatic pressure but isolated from the acoustic signal. The sensing leg is exposed to both the hydrostatic pressure and the acoustic wave signal. The signal output from the interferometer is indicative of changes in the acoustic wave signal.

U.S. Pat. No. 5,504,720, issued Apr. 2, 1996, to Meyer et al, discloses a plurality of air-backed elongate mandrels that are arranged in an planar array such that their longitudinal axes are parallel. A length of a first optical fiber is wound around portions of each mandrel in a first group of the mandrels for exposure to the parameter. The first optical fiber is arranged such that exposing it to the parameter to be sensed causes the length of the first optical fiber to increase and decrease in direct proportion as the parameter increases and decreases. A length of the second optical fiber is wound around a second group of the mandrels for exposure to the parameter. The second optical fiber preferably is arranged such that exposing it to the parameter to be sensed causes the length of the second optical fiber to increase and decrease in inverse proportion as the parameter increases and decreases.

U.S. Pat. No. 5,668,779, issued Sep. 16, 1997, to Dandridge et al, discloses a hydrophone group for shallow towed applications in less than 50 feet of water. The hydrophone group has a series of hydrophones connected by relatively insensitive fiber optic interconnects. The individual hydrophones are sufficiently sensitive such that the interconnecting optical fiber does not introduce excessive noise. Each hydrophone is basically a sensing fiber wrapped around an air-backed mandrel. Each air-backed mandrel is formed of an extended solid frame substantially non-compliant along a longitudinal axis. The extended solid frame is provided with a channel around the periphery thereof. The channel extends substantially the entire length of the extended solid frame. A flexible outer covering surrounds the extended solid frame. The flexible outer covering is highly compliant in a radial direction extending from the longitudinal axis. The air-backed mandrel has a high frequency mechanical resonance. Each hydrophone is connected in a chain by a plurality of interconnects having a substantially lower sensitivity than each hydrophone.

U.S. Pat. No. 6,122,225, issued Sep. 19, 2000, to Cheng et al, discloses device for measuring pressure waves in a liquid medium that has a compensation chamber beneath the sensor. Cylindrical embodiments have an inner mandrel and an outer mandrel with a fiber sensor positioned between the two mandrels. A compensating chamber is defined between the inner mandrel and outer mandrel; however, the interior of the inner mandrel is filled with gas. No provision is made for equalizing the pressure of the inner mandrel with environmental pressure. It is presumed that at significant environmental pressures, the pressure inside the compensating chamber would act to compress the gas within the inner mandrel. The compressed gas in the inner mandrel would change the fiber sensor length and affect the path mismatch of the interferometer.

The above cited prior art does not disclose a hydrophone design which allows for path matching to be marinated over changes in static pressure and, additionally, provide enhanced sensitivity to allow high pressure usage. The solutions to the above described and/or related problems have been long sought without success. Consequently, those skilled in the art will appreciate the present invention that addresses the above and other problems.

SUMMARY OF THE INVENTION

It is a general purpose of the present invention to provide an improved hydrophone.

An object of the present invention is to permit use of inexpensive higher frequency noise lasers for interrogating the hydrophone interferometer.

Another object of the present invention is to enhance hydrophone sensitivity. These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention may provide an interferometric hydrophone incorporating a sensor and comprised of an inner mandrel wherein the interior may be open to the surrounding fluid. Optical fiber is preferably wound upon the inner mandrel. A second cylindrical mandrel may be provided around the first. A cylindrical case may enclose the other mandrels. In one embodiment, a first chamber is defined between the inner and second mandrels and ends of the outer case. The first chamber may be filled with fluid and connected to the surrounding fluid through a small orifice. A second chamber may be formed between the second mandrel and case, which is sealed and filled with gas or vacuum.

Another embodiment includes an interferometric hydrophone incorporating a sensor arm comprised of an inner mandrel open to the surrounding fluid and optical fiber wound upon the inner mandrel. In this embodiment, an outer cylindrical case may enclose the other parts including a cylindrical shell of pressure compliant material around the first mandrel. The pressure compliant material may extend outward to the case. A chamber may be defined between the inner mandrel and cylindrical compliant shell, and ends of the outer case. The chamber may be filled with fluid and connected to the outer fluid through a small orifice. In one embodiment, at least one orifice is sized large enough to permit fluid flow to equalize pressure across said first mandrel due to static pressure, but restrict fluid due to at least some signal frequencies. The orifice may be designed to reduce sensitivity to low frequencies while the device simultaneously increases sensitivity to high frequencies due to higher static pressures.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein:

FIG. 4 is an elevational view, in section, along lines 4-4 of FIG. 4 showing a hydrophone design in accord with one embodiment of the present invention;

FIG. 4 is an elevational view, in section, showing an encased hydrophone design with multiple inner mandrels in accord with one embodiment of the present invention;

FIG. 5 is an elevational view, in section, showing one possible embodiment of the present invention in the form of a pseudo-Fabry-Perot type hydrophone;

FIG. 6 is an elevational view, in section, showing one possible embodiment of the present invention in the form of a Michelson type hydrophone;

DESCRIPTION OF THE PREFERRED EMBODIMENT

Figure 1:
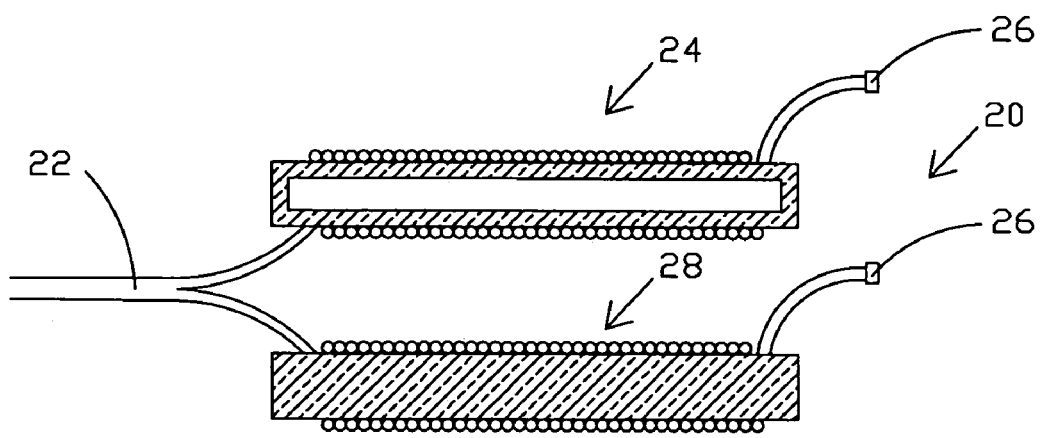
FIG. 1 is an elevational view, in section, showing one form of a prior art Michelson type interferometer hydrophone.
Figure 2:
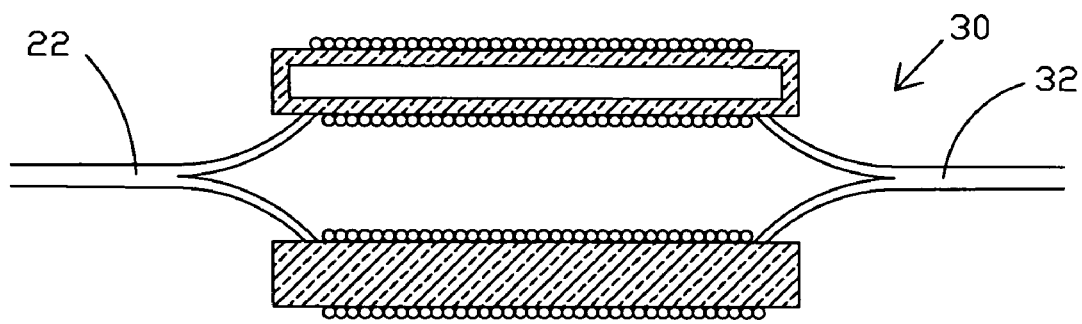
FIG. 2 is an elevational view, in section, showing one form of a prior art Mach-Zehnder type interferometer hydrophone.
Figure 3:
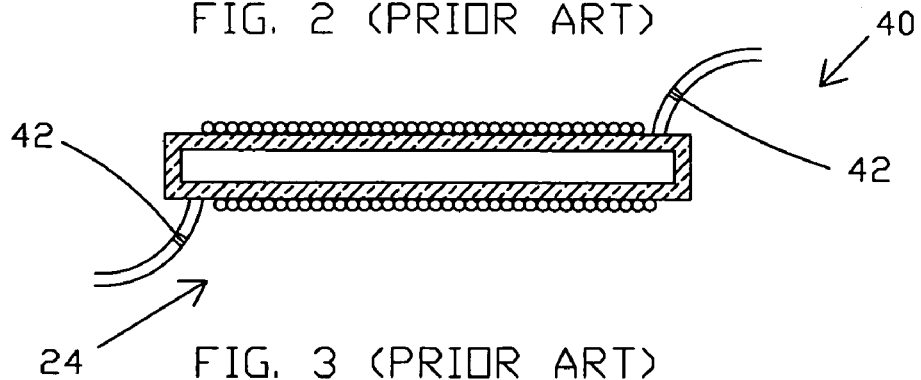
FIG. 3 is an elevational view, in section, showing one form of a prior art pseudo-Fabry-Perot type interferometer hydrophone.

The presently described hydrophone provides enhanced sensitivity due to the ratios of the mandrel diameters, as discussed hereinafter. Accordingly, this feature provides greater sensitivity than other designs. This is especially useful in hydrophones designed for operation at great depths where sensitivity must be sacrificed to allow static pressure tolerance. This feature allows better performance in the same bottom mounted hydrophone array applications mentioned above.

Additionally, the present invention utilizes a structure that provides a high pass filter function, which makes the hydrophone insensitive to low frequency signals and static pressure changes. As a result, a change in the operational depth of the hydrophone does not result in a path mismatch of the interferometer. The hydrophone may be manufactured with and maintain a path mismatch of a few millimeters. This small path mismatch minimizes the system laser phase noise, allowing the use of lasers with higher frequency noise than those typically used within the present art, while still maintaining required noise performance. Less expensive diode lasers may be used, reducing laser cost by an order of magnitude or more. This in turn permits systems in which the transmitter portion is disposable or which may be used in situations involving a high risk of loss. For instance, systems incorporating the present invention may be deployed bottom-mounted hydrophone arrays for Navy surveillance, or for seismic oil and gas field exploration or oil field monitoring. The low frequency filtering provided by the present invention is also advantageous in some systems susceptible to interfering low frequency signals.

Referring now to the drawings and more particularly to FIG. 4 and FIG. 5, there is shown the sensor mandrel portion of a hydrophone design 10 in accord with the present invention. Optical fiber 52 is wrapped around an inner mandrel 54, the interior 56 of which is open to the surrounding fluid. A second mandrel 58 is located radially outwardly around the first mandrel, i.e., inner mandrel 54, and therefore second mandrel 58 necessarily has a larger diameter than inner mandrel 54. A third, even larger diameter cylindrical case 60 is located radially outwardly around second mandrel 58. Ends 62 of case 60 enclose the ends of the inner mandrel 54 and second mandrel 58 and seal the spaces between inner mandrel 54 and second mandrel 58 into separate chambers.

The first sealed chamber 64 is located in the annulus between case 60 and second mandrel 58. First sealed chamber 64 is preferably filled with air or other gas or vacuum.

The second chamber 66 is located between second mandrel 58 and first or inner mandrel 54. Second chamber 66 is preferably not completely sealed, but may instead be connected with the outside fluid through a small orifice 68 in outer case 60. In one embodiment, small orifice 68 may typically range in diameter between 0.01 mm and 3 mm. However, the size of orifice 68 and the size of second chamber 66 may be selected as desired to produce a high pass frequency filter as explained hereinbelow. For instance, the relative sizes of orifice 68 and second chamber 66 may be selected so that for low frequency waves less than 10 to 20 Hz, the fluid is able to fill and deplete second chamber 66 rapidly enough so that pressure variations produced thereby are effectively eliminated. At higher frequencies, the diameter of the orifice prevents the elimination differential pressures created across inner mandrel 54.

As well, the materials and thicknesses of the different parts are chosen to give the proper performance. Outer case 60 may preferably be designed to be non-compliant to pressure, changing its volume very little. Second mandrel 58 is designed to be compliant to pressure, being pushed outward against air filled first chamber 64. However, second mandrel 58 must also be sufficiently strong to withstand the maximum pressure to be seen by hydrophone 10. Inner mandrel or first mandrel 54 is preferably very compliant, so that in practice its compliance is tied to the volume changes in second chamber 66 provided by second mandrel 58.

In operation, hydrophone 10 may preferably act differently according to the frequency of the acoustic pressure signal. When slow pressure changes or low frequency pressure signals are applied to hydrophone 10, the fluid passes through the orifice 68 to equalize pressure on either side of the inner or first mandrel 54, which provides a fiber wrapped sensor. The pressure expands second mandrel 58, which is air-backed, but has no affect on the sensor fiber 52. Thus, large pressure changes can be accommodated without changing the length of optical fiber 52 and hence not changing the path mismatch of the interferometer. When a high frequency signal acts on the device, the small orifice 68 restricts the rapid flow of fluid, preventing equalization of the pressure across first or inner mandrel 54, which acts as the sensor mandrel. The pressure causes an expansion of the air-backed second mandrel 58 and fiber wrapped inner mandrel 54. This expansion causes a length change in optical fiber 52 that is wrapped upon inner mandrel 54. This expansion is read as a phase signal by the interferometer.

Because the air backed second mandrel 58 is larger in diameter than inner mandrel 54, the expansion of second mandrel 58 results in a greater volume change. When inner mandrel 54 expands to fill this volume, it experiences a greater diameter and hence perimeter change. This effect increases the sensor's sensitivity by the ratio of the diameter of air-backed second mandrel 58 to the diameter of inner mandrel 54. Hence, rather than working to the detriment of sensitivity as in the previous art earlier described, the present configuration uses the volume difference between inner and outer mandrels in reverse to enhance sensitivity.

FIG. 6 shows the use of the construction of sensor mandrel 10 to provide hydrophone 70 of the pseudo-Fabry-Perot type. Bragg gratings 72 may be written in the core at either end of the sensor fiber 52. They in turn are wound onto thermal compensating cylindrical mounts 74.

Figures 7, 8:
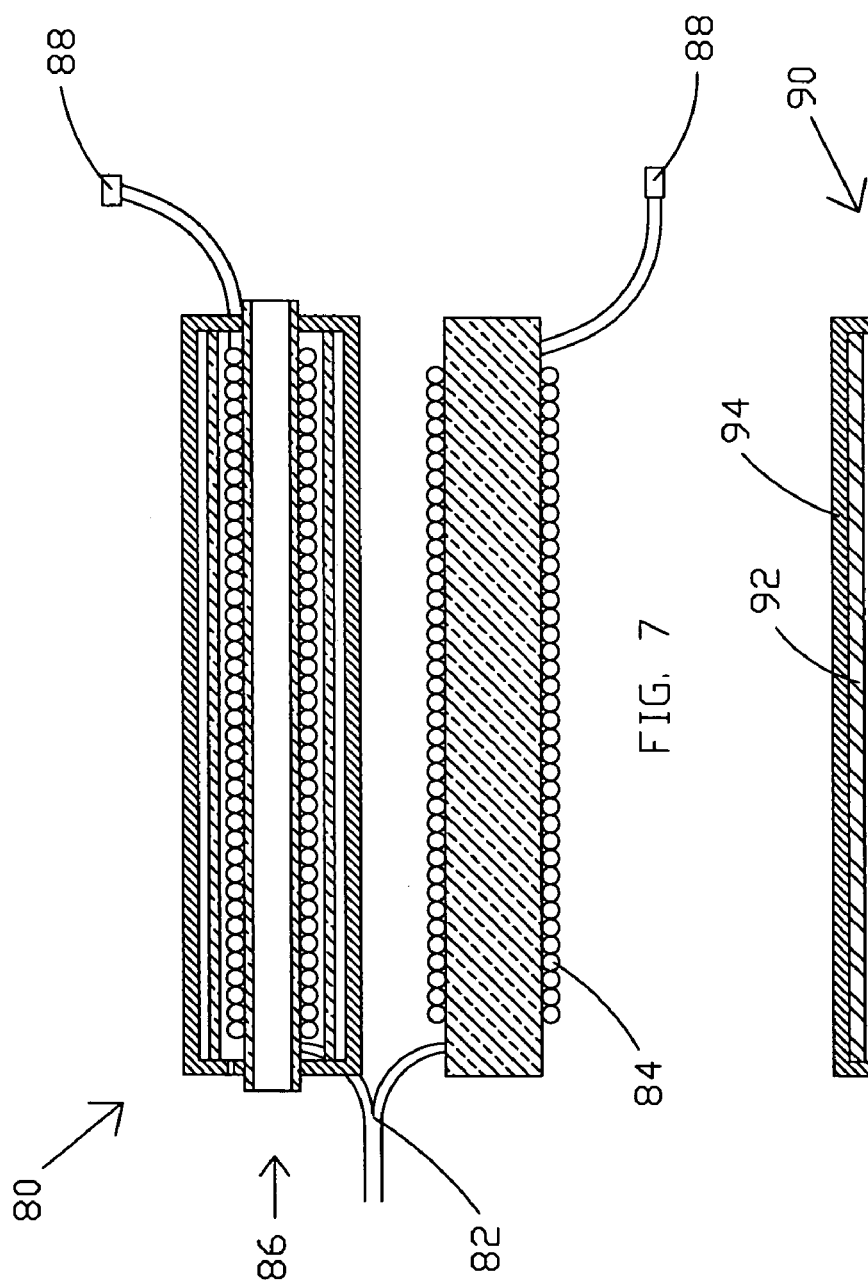
FIG. 7 is an elevational view, in section, showing another possible alternate embodiment of the present invention.
FIG. 8 is an elevational view, in section, showing yet another possible alternate embodiment of the present invention.

FIG. 7 shows the use of this sensor mandrel to provide Michelson type hydrophone 80. A coupler 82 and reference winding 84 are located next to sensor mandrel structure 86. Reflectors 88 are located at the ends of the two fibers. It should be understood that numerous other physical arrangements of the basic components could be used.

FIG. 8 shows another possible alternative sensor structure 90 in accord with the present invention. In this case, second mandrel 58 of FIGS. 4 and 6 is replaced with cylindrical shell 92 of pressure compliant material, such as closed cell foam or other material that compresses with applied pressure. This cylinder extends outward to cylindrical case 94, eliminating the air-filled chamber 64 in FIGS. 4 and 6. In operation, this cylindrical shell has the same function as the second mandrel and air chamber.

The invention has several advantages over the previous art. In one embodiment, hydrophones 10, 70, 80, and 90 may be designed to provide a high pass filter function to make the hydrophones insensitive to low frequency signals and static pressure changes. As a result, a change in the operational depth of the hydrophone does not result in a path mismatch of the interferometer. Hydrophones 10, 70, 80, and 90 may be manufactured with and maintain a path mismatch of a few millimeters. This small path mismatch minimizes the system laser phase noise, allowing the use of lasers with higher frequency noise than those typically used within the present art, while still maintaining required noise performance. Such lasers as diode lasers may be used, reducing laser cost by an order of magnitude or more. This in turn permits systems in which the transmitter portion of the interferometric system is either disposable or at high risk of loss, such as in deployed bottom-mounted hydrophone arrays for Navy surveillance, or for seismic oil and gas field exploration or oil field monitoring. The low frequency filtering is also advantageous in some systems susceptible to interfering low frequency signals.

Hydrophones 10, 70, 80, and 90 have enhanced sensitivity due to the ratios of the mandrel diameters. This provides greater sensitivity than other designs. This is especially useful in hydrophones designed for operation at great depths where sensitivity must be sacrificed to allow static pressure tolerance. This allows better performance in the same bottom mounted hydrophone array applications mentioned hereinbefore.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An interferometric hydrophone operable for use in surrounding fluid, comprising:
   a first mandrel defining an interior which is open to said surrounding fluid and an exterior;
   sensing optical fiber wound upon said first mandrel exterior;
   a second mandrel positioned in surrounding relationship with respect to said first mandrel, said first mandrel and said second mandrel defining a first chamber therebetween;
   a case enclosing said first mandrel and said second mandrel and said first chamber, said case and said second mandrel defining a second chamber therebetween which is sealed; and
   a gas in said second chamber.

2. The interferometric hydrophone of claim 1 wherein:
   said sensing optical fiber wound upon said first mandrel has a first portion wound proximate a first end of said first mandrel, an intermediate portion wound at a middle of said first mandrel, and a second portion wound proximate a second end of said first mandrel;
   said sensing optical fiber has a first partial reflector formed in said sensing optical fiber at said first portion; and
   said sensing optical fiber has a second partial reflector formed in said sensing optical fiber at said second portion.

3. The interferometric hydrophone of claim 2 wherein said first partial reflector and said second partial reflector are fiber Bragg gratings.

4. The interferometric hydrophone of claim 3, further comprising temperature compensating cylindrical mounts positioned on said first mandrel at the first end and the second end and supporting said fiber Bragg gratings.

5. The interferometric hydrophone of claim 1 further comprising:
   an optical fiber for communicating with the interferometric hydrophone;
   an optical fiber coupler having a combined port, a first divided port, and a second divided port, said optical fiber being joined to said combined port, and said sensing optical fiber first end being joined to said first divided port;
   a reference optical fiber having a first end joined to said second divided port and a second end, said reference optical fiber providing a reference length of optical fiber and being positioned adjacent said sensing optical fiber;
   a first reflector positioned on the second end of said sensing optical fiber; and
   a second reflector positioned on the second end of said reference optical fiber.

6. The interferometric hydrophone of claim 1 further comprising:
   an input optical fiber for communicating with the interferometric hydrophone;
   a first optical fiber coupler having a combined port, a first divided port, and a second divided port, said input optical fiber being joined to said combined port, and said sensing optical fiber first end being joined to said first optical fiber coupler first divided port;
   a reference optical fiber having a first end joined to said first optical fiber coupler second divided port and a second end, said reference optical fiber providing a reference length of optical fiber and being positioned adjacent said sensing optical fiber;
   a second optical fiber coupler having a combined port, a first divided port, and a second divided port, said sensing optical fiber second end being joined to said second optical fiber coupler first combined port, and said reference optical fiber second end being joined to said second optical fiber coupler second divided port; and
   an output optical fiber joined to said second optical fiber coupler combined port for receiving communication from the interferometric hydrophone.

7. The interferometric hydrophone of claim 1 wherein said case further defines at least one orifice which interconnects said first chamber to said surrounding fluid.

8. The interferometric hydrophone of claim 7 wherein said at least one orifice is sized large enough to permit fluid flow to equalize pressure across said first mandrel due to static pressure but restrict fluid caused by at least some pressure wave frequencies in said surrounding fluid.

9. An interferometric hydrophone operable for use in surrounding fluid, comprising:

a first mandrel defining an interior which is open to said surrounding fluid and an exterior;

a sensing optical fiber wound upon said first mandrel exterior having a first end and a second end;

a case enclosing said first mandrel; and pressure compliant material mounted in an annulus between said first mandrel exterior and said case, said first mandrel and said pressure compliant material defining a chamber therebetween, said pressure compliant material extending radially outwardly to said case, said case sealing opposite ends of said chamber except for at least one orifice defined by said case to permit fluid communication between said chamber and said surrounding fluid.

10. The interferometric hydrophone of claim 9 wherein said at least one orifice is sized large enough to permit fluid flow to equalize pressure across said first mandrel due to static pressure, but restrict fluid due to at least some signal frequencies.

11. The interferometric hydrophone of claim 10 wherein said at least one orifice is sized large enough to permit fluid flow to equalize pressure across said first mandrel due to static pressure but restrict fluid caused by at least some pressure wave frequencies in said surrounding fluid.

12. The interferometric hydrophone of claim 9 further comprising at least one partial reflector formed in said sensing optical fiber adjacent each end of said first mandrel.

13. The interferometric hydrophone of claim 12 wherein said at least one partial reflector is a fiber Bragg gratings.

14. The interferometric hydrophone of claim 13, further comprising temperature compensating cylindrical mounts positioned on each end of said first mandrel and supporting said fiber Bragg gratings.

15. The interferometric hydrophone of claim 9 further comprising:

an optical fiber for communicating with the interferometric hydrophone;

an optical fiber coupler having a combined port, a first divided port, and a second divided port, said optical fiber being joined to said combined port, and said sensing optical fiber first end being joined to said first divided port;

a reference optical fiber having a first end joined to said second divided port and a second end, said reference optical fiber providing a reference length of optical fiber and being positioned adjacent said sensing optical fiber;

a first reflector positioned on the second end of said sensing optical fiber; and a second reflector positioned on the second end of said reference optical fiber.

16. The interferometric hydrophone of claim 9 further comprising:

an input optical fiber for communicating with the interferometric hydrophone;

a first optical fiber coupler having a combined port, a first divided port, and a second divided port, said input optical fiber being joined to said combined port, and said sensing optical fiber first end being joined to said first optical fiber coupler first divided port;

a reference optical fiber having a first end joined to said first optical fiber coupler second divided port and a second end, said reference optical fiber providing a reference length of optical fiber and being positioned adjacent said sensing optical fiber;

a second optical fiber coupler having a combined port, a first divided port, and a second divided port, said sensing optical fiber second end being joined to said second optical fiber coupler first combined port, and said reference optical fiber second end being joined to said second optical fiber coupler second divided port; and an output optical fiber joined to said second optical fiber coupler combined port for receiving communication from the interferometric hydrophone.

* * * * *